(12) United States Patent
Meyers

(10) Patent No.: US 9,656,719 B1
(45) Date of Patent: May 23, 2017

(54) AXLE ARRANGEMENT FOR A REAR HUB OF A BICYCLE

(71) Applicant: Kurt Manufacturing Company, Inc., Minneapolis, MN (US)

(72) Inventor: Bradd R. Meyers, Coon Rapids, MN (US)

(73) Assignee: KURT MANUFACTURING COMPANY, INC., Minneapolis, MN (US)

( * ) Notice: Subject to any disclaimer, the term of this patent is extended or adjusted under 35 U.S.C. 154(b) by 597 days.

(21) Appl. No.: 13/832,544

(22) Filed: Mar. 15, 2013

(51) Int. Cl.
 *B60B 35/00* (2006.01)
 *B62K 25/02* (2006.01)

(52) U.S. Cl.
 CPC ............ *B62K 25/02* (2013.01); *B60B 35/004* (2013.01)

(58) Field of Classification Search
 CPC .. B62K 25/02; B62K 2206/00; B60B 27/023; B60B 27/026; B60B 35/00; B60B 35/04; B60B 35/004; B60B 35/08; B60B 35/02; B60B 35/025
 USPC ............................ 301/124.1, 124.2; 384/545
 See application file for complete search history.

(56) References Cited

U.S. PATENT DOCUMENTS

| | | | | |
|---|---|---|---|---|
| 579,893 | A * | 3/1897 | Osmond ....................... | 384/545 |
| 605,870 | A * | 6/1898 | Gubelmann .................. | 384/545 |
| 606,217 | A * | 6/1898 | Hoffman ...................... | 192/217.3 |
| 632,711 | A * | 9/1899 | Ganswindt .................... | 280/288 |
| 3,807,761 | A * | 4/1974 | Brilando et al. .............. | 280/279 |
| 4,400,038 | A * | 8/1983 | Hosokawa .................. | 301/124.2 |
| 4,405,180 | A * | 9/1983 | Butz ....................... | B60B 27/023 280/279 |
| 4,412,706 | A * | 11/1983 | Hopper, Jr. .................... | 384/545 |
| 4,424,981 | A * | 1/1984 | Maxwell, III ......... | B62K 25/02 280/279 |
| D315,122 | S * | 3/1991 | Schramm ...................... | D12/115 |
| 5,215,324 | A * | 6/1993 | Kawai .......................... | 280/279 |
| 5,284,383 | A * | 2/1994 | Lehanneur ................. | 301/110.5 |
| 5,301,778 | A * | 4/1994 | Haeussinger ................... | 192/64 |
| 5,383,716 | A * | 1/1995 | Stewart et al. ............ | 301/124.2 |

(Continued)

FOREIGN PATENT DOCUMENTS

| | | |
|---|---|---|
| GB | 491924 A | 3/1937 |
| WO | 9503861 A1 | 2/1995 |
| WO | 2009006559 A1 | 1/2009 |

OTHER PUBLICATIONS

"Tech Speak: 142×12, What's the Big Idea?" written by Zach Overholt published on Feb. 7, 2011 on BikeRumor.com, http://www.bikerumor.com/2011/02/07/tech-speak-142x12-whats-the-big-idea/.

*Primary Examiner* — Jason Bellinger
(74) *Attorney, Agent, or Firm* — Steven M. Koehler; Westman, Champlin & Koehler, P.A.

(57) ABSTRACT

An axle arrangement for a rear hub of a bicycle includes an axle skewer having at a first end threads formed on an outer surface thereof, and at a second end remote from the first end, an enlarged head having an annular surface facing the first end. A nut has threads to threadably engage the axle shaft at the first end. Each of the enlarged end and the nut are configured with surfaces so as to be fixably secured to couplers of a bicycle trainer. A kit includes the axle arrangement and two or more of a spacer and/or an adapter wherein each of said spacers and/or adapters are separately configured to adapt the axle arrangement to a different manufacturer of a bicycle.

10 Claims, 5 Drawing Sheets

(56) References Cited

U.S. PATENT DOCUMENTS

| | | | | |
|---|---|---|---|---|
| 5,494,390 A * | 2/1996 | Gonzales | ............... | B62K 25/02 |
| | | | | 280/281.1 |
| 5,567,020 A * | 10/1996 | Phillips et al. | ............ | 301/124.2 |
| 6,241,322 B1 * | 6/2001 | Phillips | ...................... | 301/124.2 |
| 6,260,931 B1 * | 7/2001 | Stewart | ..................... | 301/124.2 |
| 6,886,894 B2 * | 5/2005 | Kanehisa | ............... | B62K 25/02 |
| | | | | 180/385 |
| 7,166,054 B2 * | 1/2007 | Urabe | .......................... | 475/297 |
| RE39,528 E * | 3/2007 | Kanehisa et al. | ........... | 301/110.5 |
| D545,184 S * | 6/2007 | Hanamura | ..................... | D8/397 |
| 7,537,291 B2 * | 5/2009 | Hara | ........................ | 301/124.2 |
| 7,581,795 B1 * | 9/2009 | Chen | ........................ | 301/110.5 |
| 7,607,507 B2 * | 10/2009 | Lane et al. | .................... | 180/260 |
| 7,673,947 B2 * | 3/2010 | Chang | ........................ | 301/124.2 |
| 7,731,428 B2 * | 6/2010 | Kuan | .......................... | 384/545 |
| 7,946,659 B2 * | 5/2011 | Gratz | ....................... | B60B 5/02 |
| | | | | 301/124.2 |
| 8,573,878 B2 * | 11/2013 | Chang | ........................ | 403/322.4 |
| 8,573,879 B2 * | 11/2013 | Chang | ........................ | 403/322.4 |
| 8,684,243 B1 | 4/2014 | Baumann | | |
| 2004/0183361 A1 * | 9/2004 | Chen | ........................ | 301/110.5 |
| 2008/0185907 A1 * | 8/2008 | Hara et al. | ............... | 301/111.03 |
| 2008/0197602 A1 * | 8/2008 | Watarai | ...................... | 280/281.1 |
| 2008/0284127 A1 * | 11/2008 | Watarai | ........................ | 280/279 |
| 2009/0243255 A1 * | 10/2009 | Ashman | ........................ | 280/288 |
| 2011/0259658 A1 * | 10/2011 | Huang et al. | ............... | 180/65.51 |
| 2013/0241175 A1 * | 9/2013 | Talavasek et al. | ......... | 280/288.4 |
| 2013/0328385 A1 * | 12/2013 | Kuo | .......................... | 301/124.2 |
| 2015/0054254 A1 * | 2/2015 | Spahr et al. | .................. | 280/278 |
| 2015/0069827 A1 * | 3/2015 | Nakajima et al. | ......... | 301/124.2 |

\* cited by examiner

AXLE ARRANGEMENT FOR A REAR HUB OF A BICYCLE

BACKGROUND

The discussion below is merely provided for general background information and is not intended to be used as an aid in determining the scope of the claimed subject matter.

Thru axles are now being used to fasten the rear wheel assembly to a bicycle and are of size and length to be inserted through apertures in the rear forks as well as through the hub assembly of the rear wheel. Upon insertion of the thru axle through the hub assembly, threads provided on the end of the axle are threaded into one of the rear forks. A head at the other end of the axle includes a recess, for a tool such as an Allen wrench is used to turn the axle. The head engages the other rear fork on the bicycle. For some manufactures, the design and length of the axle is such that neither side when finally mounted to the bicycle has an exposed portion, or much of an exposed portion beyond the outwardly facing surfaces of the forks.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A first aspect is an axle arrangement for a rear hub of a bicycle that includes an axle skewer having at a first end threads formed on an outer surface thereof configured to threadably engage a frame fork of a bicycle, and at a second end remote from the first end, an enlarged head having an annular surface facing the first end. A nut has threads to threadably engage the axle shaft at the first end. Each of the enlarged end and the nut are configured with surfaces so as to be fixably secured to couplers of a bicycle trainer.

A second aspect is a kit that includes the above-mentioned axle arrangement and two or more of a spacer and/or an adapter wherein each of said spacers and/or adapters are separately configured to adapt the axle arrangement to a different manufacturer of a bicycle.

DETAILED DESCRIPTION OF ILLUSTRATIVE EMBODIMENTS

Although the thru axle allows mounting of the rear to the bicycle, the lack of or minimal exposure of end portions inhibits use of the bicycle on a bicycle trainer.

Figure 5:
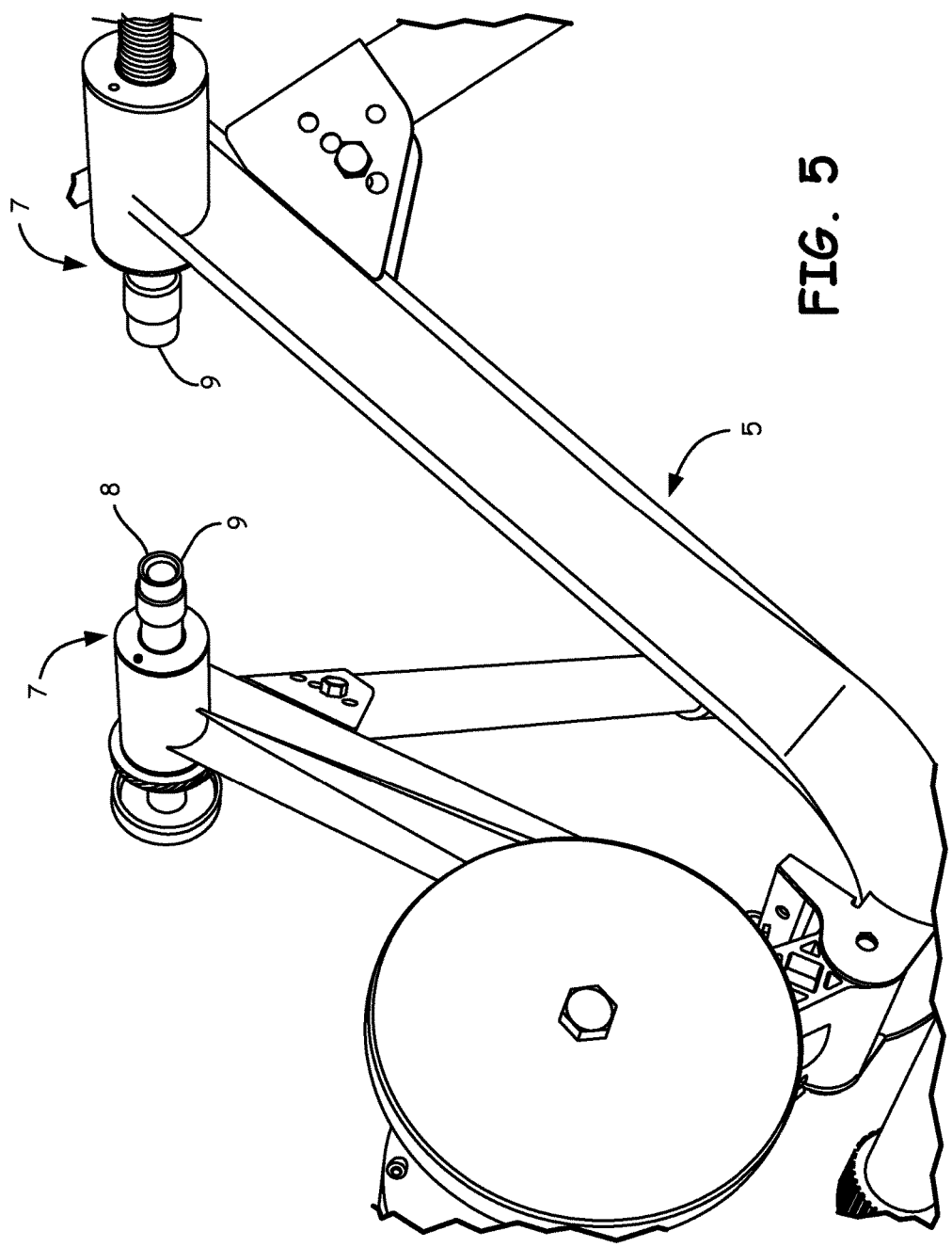
FIG. 5 is a perspective view of a portion of a bicycle trainer.

An axle arrangement 10 to overcome this problem is illustrated in the figures and includes a thru axle skewer 12 having ends 14 and 16 configured for attachment to couplers of a bicycle trainer. Such couplers are well known. FIG. 5 illustrates a portion of a bicycle trainer 5 having such couplers indicated at 7. Each coupler 7 has a recess 8 (typically a cylindrical bore) formed or defined by a perimeter wall 9.

Figure 3:
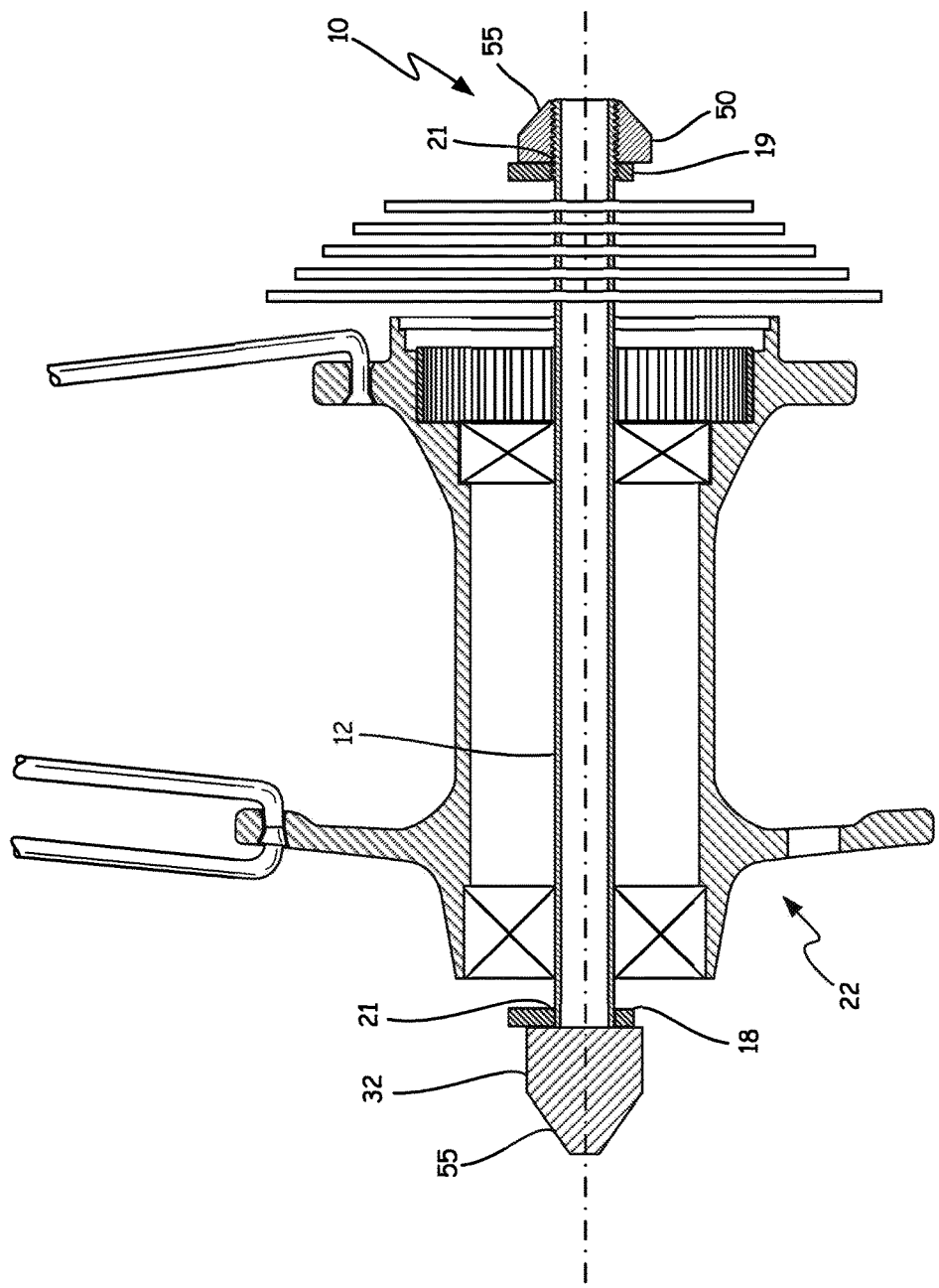
FIG. 3 is a sectional view of a rear wheel of a bicycle with the axle arrangement.
Figure 4:
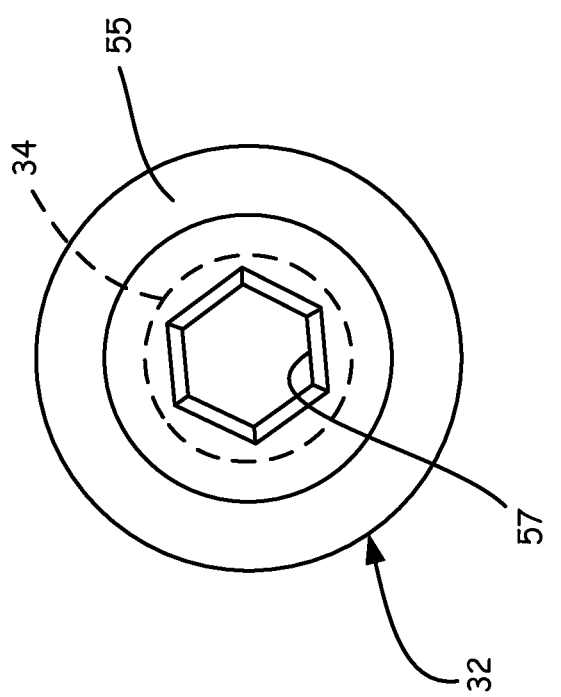
FIG. 4 is an end view of an axle skewer.

In FIG. 3 a hub assembly 22 of a bicycle is schematically illustrated with axle arrangement 10. Typically, receiving ends 18 and 19 of forks (not otherwise illustrated) are called dropout ends. The axle 12 has a shaft diameter suitable for insertion through apertures 21 in the dropout ends 18,19 of the forks as well as through a hub assembly 22 of a bicycle rear wheel.

At a first end 30 of the axle 12, an enlarged head 32 is fixably secured to the axle shaft 34 to form an integral structure in a manner that typically prevents rotation of the enlarged head 32 separate from the axle shaft 34. The enlarged head 32 includes an extending annular flange 36 about the axle shaft 34 which contacts an outwardly facing surface 40 of one of the dropout ends 18,19 (herein 18) when the axle shaft 34 is inserted through the aperture 21 and into the hub assembly 22.

At the other end 42 remote from the enlarged head 32, threads 46 are provided on an outer surface. The threads 46 of the shaft extend through and outwardly from the aperture 21 of the other drop out end of the fork.

A nut 50 threadably mates with the second end 42 of the axle 12 on the portion extending outwardly from the aperture 21 of the drop out end 19. The nut 50 includes an enlarged annular flange 52 that contacts the outwardly facing surface of the second drop out end 19 of the forks 22 when the nut 50 threadably mates with the threads 46 of the axle shaft 34. Like the enlarged end 32, the nut 50 is configured so as to form a secure engagement with a coupler of a bicycle trainer. In the embodiment illustrated, both the enlarged end 32 and the nut 50 include a tapered or conical annular surface 55, extending outwardly away from the forks 22 configured to be at least partially in each corresponding recess 8. Stated another way, each of the enlarged head 32 and the nut 50 have oppositely facing conical annular surfaces 55 when the nut 50 is threaded upon the skewer, where each of the conical annular surfaces 55 has cross section therethrough reducing in a direction away from the other conical annular surface 55. Suitable surfaces are provided on the enlarged end 32 and on the nut 50 to allow tightening of the nut 50 on the axle shaft 34 when the axle shaft 34 is maintained (herein via enlarged head 32) in a stationary position. In the embodiment illustrated, the suitable surfaces of the enlarged end 32 are configured so as to provide a recess 57 suitable for an Allen wrench. On the nut 50, the suitable surfaces are spaced apart flat surfaces 59 on the flange 52. It should be understood, the suitable surfaces herein illustrated are advantageous but exemplary in that other suitable surfaces can be used.

Figure 1:
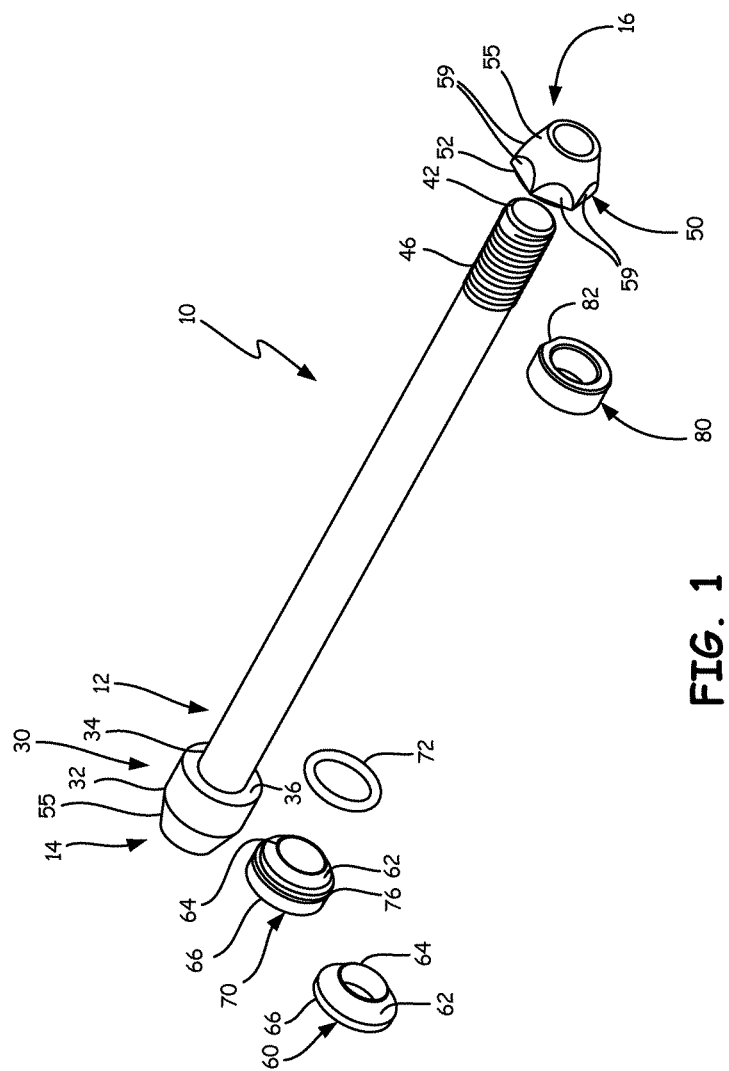
FIG. 1 is a perspective view of an axle arrangement with adapters and a spacer.
Figure 2:
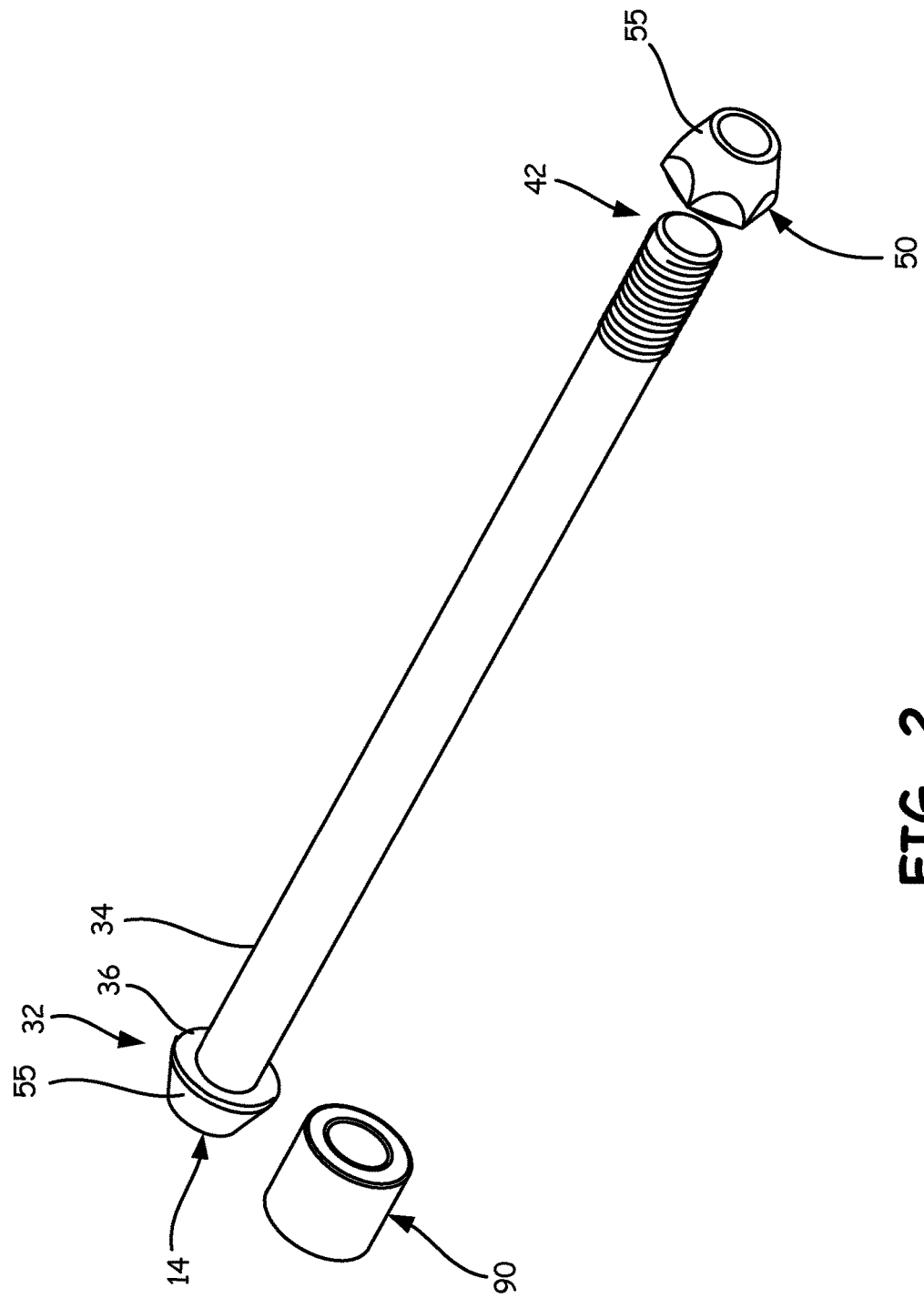
FIG. 2 is a perspective view of the axle arrangement with another spacer.

In a particularly advantageous embodiment, the length of the axle shaft 34 is of sufficient length to be used on a plurality of bicycles sold by different manufacturers. Depending on the manufacturer, spacers and/or other adapters each of which having an aperture through which the axle shaft 34 can extend therethrough are provided. In a first embodiment, an adapter 60 includes a conical surface 62. The conically shaped adapter 60 has an aperture 64 through which the shaft 34 can extend. On an end of the adapter 60 opposite the conical surface 62 an enlarged end surface 66 that engages, herein the annular flange 36 of the enlarged head 32. Since the conical surface 62 of the adapter 60 engages edges of the aperture 21, the adapter 60 centers the shaft 34 in the aperture 21. Two such adaptors are illustrated in FIG. 1 at 60 and 70. Adaptor 70 also includes the conical surface 62, aperture 64 and enlarged end surface 66, but further includes a flexible ring 72 that encircles the adapter 70, being disposed in an annular groove 76 provided therein. The flexible ring 72 also aids in centering the shaft 34 in the aperture 21.

A cylindrical spacer 80 is provided and configured so as to configure the thru axle 12 for use on a bicycle of yet a different manufacturer. The spacer 80 herein by example is disposed at the end 42, and in particular between an outwardly surface of the drop out end 19 of the forks and the annular flange 52 of the nut 50. The spacer 80 encircles some of the threads 46 of the shaft 34 and has a longitudinal length so as to fill the space between the outwardly facing surface of the drop out end 19 of the forks and the annular flange 52 of the nut 50, while allowing the nut 50 to be securely attached to the remaining exposed threads 46 of the shaft 34. The spacer 80 can include a flat surface 82 on the circumference configured to correspond to and engage a corresponding flat surface provided on the drop out end of the fork. Spacer 90 is similar to spacer 80 but has a different longitudinal length and herein is mounted on the end 30.

In one embodiment, the axle skewer 12, nut 50 and two or more spacers 80,90 and/or adaptors 60,70 can be sold as a kit thereby allowing a single product to accommodate a plurality of different bicycle manufacturers.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. An axle arrangement for a rear hub of a bicycle, comprising:
    an axle skewer having:
        at a first end, threads formed on an outer surface thereof configured to extend through an aperture in a frame fork of the bicycle, and
        at a second end remote from the first end, an enlarged head having an annular surface facing the first end wherein the annular surface of the enlarged head is fixed to the axle skewer such that rotation of the enlarged head is prevented relative to the axle skewer; and
    a fastener having threads to threadably engage the axle skewer at the first end, and wherein each of the enlarged head and the fastener are configured with surfaces so as to be fixably secured to couplers of a bicycle trainer, said surfaces comprising oppositely facing annular surfaces when the fastener is threaded upon the skewer; and
    an adapter having an aperture configured to receive the first end and through which the axle skewer is slidable such that the adapter is slidable along the axle skewer from the first end, the adapter comprising a first annular surface configured to releasably engage the annular surface of the enlarged head and an annular conical surface extending in a direction opposite the first annular surface.

2. The axle arrangement of claim 1 and further comprising a spacer having an aperture through which the axle skewer slidably extends.

3. The axle arrangement of claim 1 wherein the adapter includes a flexible ring disposed about a circumferential surface of the adapter.

4. A kit comprising an axle arrangement for a rear hub of a bicycle,
    the kit comprising:
        an axle skewer having at a first end threads formed on an outer surface thereof configured to extend through an aperture in a frame fork of the bicycle, and at a second end remote from the first end, and an enlarged head having an annular surface facing the first end wherein the annular surface of the enlarged head is fixed to the axle skewer such that rotation of the enlarged head is prevented relative to the axle skewer;
        a nut configured to threadably engage the axle skewer at the first end, wherein each of the enlarged head and the nut are configured with surfaces so as to be fixably secured to couplers of a bicycle trainer wherein the nut has an annular surface configured to face the annular surface of the enlarged head when the nut is threadably engaged with the axle skewer;
        a first spacer with an aperture of a size to receive the first end and where the first space is slidable along the axle skewer from the first end, the first spacer having a first axial length along a length of the axle skewer; and
        a first spacer with an aperture of a size to receive the first end and where the second spacer is slidable along the axle skewer from the first end, the second spacer having a second axial length along a length of the axle skewer, wherein the first axial length is different than the second axial length.

5. The kit comprising the axle arrangement of claim 4 wherein each of the enlarged head and the nut have oppositely facing conical annular surfaces when the nut is threaded upon the skewer, each of the conical annular surfaces having a cross section therethrough, the cross sections reducing in a direction away from the other conical annular surface.

6. The kit comprising the axle arrangement of claim 4, wherein each of said spacers are separately configured to adapt the axle arrangement to a different manufacturer of a bicycle.

7. The axle arrangement of claim 1, and further comprising at least one spacer with an aperture of a size to receive the first end.

8. The axle arrangement of claim 1, the fastener having an annular surface configured to face the annular surface of the enlarged end when the fastener is threadably engaged with the axle skewer.

9. The kit comprising the axle arrangement of claim 4, where the first spacer comprises a first annular surface configured to releasably engage the annular surface of the enlarged head and an annular conical surface extending in a direction opposite the first annular surface.

10. The kit comprising the axle arrangement of claim 4, wherein each of said spacers are separately configured to adapt the axle arrangement to a different manufacturer of a bicycle.

* * * * *

UNITED STATES PATENT AND TRADEMARK OFFICE
CERTIFICATE OF CORRECTION

PATENT NO. : 9,656,719 B1  
APPLICATION NO. : 13/832544  
DATED : May 23, 2017  
INVENTOR(S) : Bradd R. Meyers Page 1 of 1

It is certified that error appears in the above-identified patent and that said Letters Patent is hereby corrected as shown below:

In the Claims

In Claim 4, Column 4, Line 13, delete "and".

In Claim 4, Column 4, Line 27, delete "space" and insert --spacer--.

In Claim 4, Column 4, Line 31, delete "first spacer" and insert --second spacer--.

Signed and Sealed this
Nineteenth Day of February, 2019

Andrei Iancu
*Director of the United States Patent and Trademark Office*